(12) United States Patent
Liu et al.

(10) Patent No.: US 11,269,547 B2
(45) Date of Patent: Mar. 8, 2022

(54) REUSING OVERWRITTEN PORTION OF WRITE BUFFER OF A STORAGE SYSTEM

(71) Applicant: EMC IP Holding Company LLC, Hopkinton, MA (US)

(72) Inventors: Yousheng Liu, Beijing (CN); Socheavy D. Heng, Framingham, MA (US); Xinlei Xu, Beijing (CN); Geng Han, Beijing (CN); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/879,459

(22) Filed: May 20, 2020

(65) Prior Publication Data
US 2021/0365206 A1     Nov. 25, 2021

(51) Int. Cl.
*G06F 3/06* (2006.01)
(52) U.S. Cl.
CPC .......... *G06F 3/0656* (2013.01); *G06F 3/0604* (2013.01); *G06F 3/065* (2013.01); *G06F 3/0644* (2013.01); *G06F 3/0659* (2013.01); *G06F 3/0673* (2013.01)
(58) Field of Classification Search
CPC .................................................... G06F 3/0656
See application file for complete search history.

(56) References Cited

U.S. PATENT DOCUMENTS

| 8,954,383 | B1 | 2/2015 | Vempati et al. |
| 9,003,227 | B1 | 4/2015 | Patel et al. |
| 9,104,675 | B1 | 8/2015 | Clark et al. |
| 9,778,996 | B1 | 10/2017 | Bono et al. |
| 2019/0243578 | A1* | 8/2019 | Thompson .............. G06F 3/068 |
| 2021/0042234 | A1* | 2/2021 | You ...................... G11C 7/1057 |

OTHER PUBLICATIONS

G. Xu et al., "LIPA: A Learning-based Indexing and Prefetching Approach for Data Deduplication," Conference: 2019 35th Symposium on Mass Storage Systems and Technologies (MSST), May 20-24, 2019, 12 pages.
NVM Express, "NVM Express, Revision 1.3," NVM Express, May 1, 2017, 282 pages.

(Continued)

*Primary Examiner* — Edward J Dudek, Jr.
(74) *Attorney, Agent, or Firm* — Ryan, Mason & Lewis, LLP

(57) ABSTRACT

An apparatus comprises at least one processing device comprising a processor coupled to a memory. The at least one processing device is configured to receive a write command at a control module of a storage system, wherein the write command comprises a write operation configured to cause one or more data pages in a page buffer associated with the control module to be overwritten with incoming data. The at least one processing device is also configured to invalidate the one or more overwritten data pages in the page buffer after committing the write operation. The at least one processing device is further configured to release the one or more invalidated data pages in the page buffer to a page buffer pool associated with the control module, wherein the page buffer pool manages available data pages in the page buffer.

20 Claims, 18 Drawing Sheets

(56) References Cited

OTHER PUBLICATIONS

U.S. Appl. No. 16/260,660, filed Jan. 29, 2019, and entitled "System and Method for Aggregating Metadata Changes in a Storage System."
U.S. Appl. No. 16/861,986 filed in the name of Vladimir Shveidel et al. filed Apr. 29, 2020, and entitled "Lockless Metadata Binary Tree Access."
U.S. Appl. No. 16/862,733 filed in the name of Alexander S. Mathews et al. filed Apr. 30, 2020, and entitled "Finding Storage Objects of a Snapshot Group Pointing to a Logical Page in a Logical Address Space of a Storage System."
U.S. Appl. No. 16/862,735 filed in the name of Dixitkumar Vishnubhai Patel et al. filed Apr. 30, 2020, and entitled "Mapping Virtual Block Addresses to Portions of a Logical Address Space that Point to the Virtual Block Addresses."
U.S. Appl. No. 16/862,740 filed in the name of Rohit K. Chawla et al. filed Apr. 30, 2020, and entitled "Generating Recommendations for Initiating Recovery of a Fault Domain Representing Logical Address Space of a Storage System."
U.S. Appl. No. 16/863,433 filed in the name of Sorin Faibish et al. filed Apr. 30, 2020, and entitled "Cache Retention for Inline Deduplication Based on Number of Physical Blocks with Common Fingerprints Among Multiple Cache Entries."

* cited by examiner

US 11,269,547 B2

REUSING OVERWRITTEN PORTION OF WRITE BUFFER OF A STORAGE SYSTEM

FIELD

The field relates generally to information processing, and more particularly to storage in information processing systems.

BACKGROUND

Storage arrays and other types of storage systems are often shared by multiple host devices (hosts) over a network. Applications running on the host devices each include one or more processes that perform the application functionality. Such processes issue input-output (TO) operation requests for delivery to the storage systems. Storage controllers of the storage systems service such requests for IO operations. The IO operations include, but are not limited to, read operations and write operations. Some storage systems use a write buffer such that when host data is written to the storage system, the data is first committed to the write buffer and a write complete message is returned to the host. Efficiently managing utilization of a write buffer can present significant challenges.

SUMMARY

Illustrative embodiments of the present disclosure provide techniques for managing one or more write operations by reusing one or more overwritten portions of a control buffer of a storage system.

For example, in one embodiment, an apparatus comprises at least one processing device comprising a processor coupled to a memory. The at least one processing device is configured to receive a write command at a control module of a storage system, wherein the write command comprises a write operation configured to cause one or more data pages in a page buffer associated with the control module to be overwritten with incoming data. The at least one processing device is also configured to invalidate the one or more overwritten data pages in the page buffer after committing the write operation. The at least one processing device is further configured to release the one or more invalidated data pages in the page buffer to a page buffer pool associated with the control module, wherein the page buffer pool manages available data pages in the page buffer.

Advantageously, when a subsequent write command is received at the control module, at least a portion of the one or more released data pages managed by the page buffer pool can be reused to process the subsequent write command.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
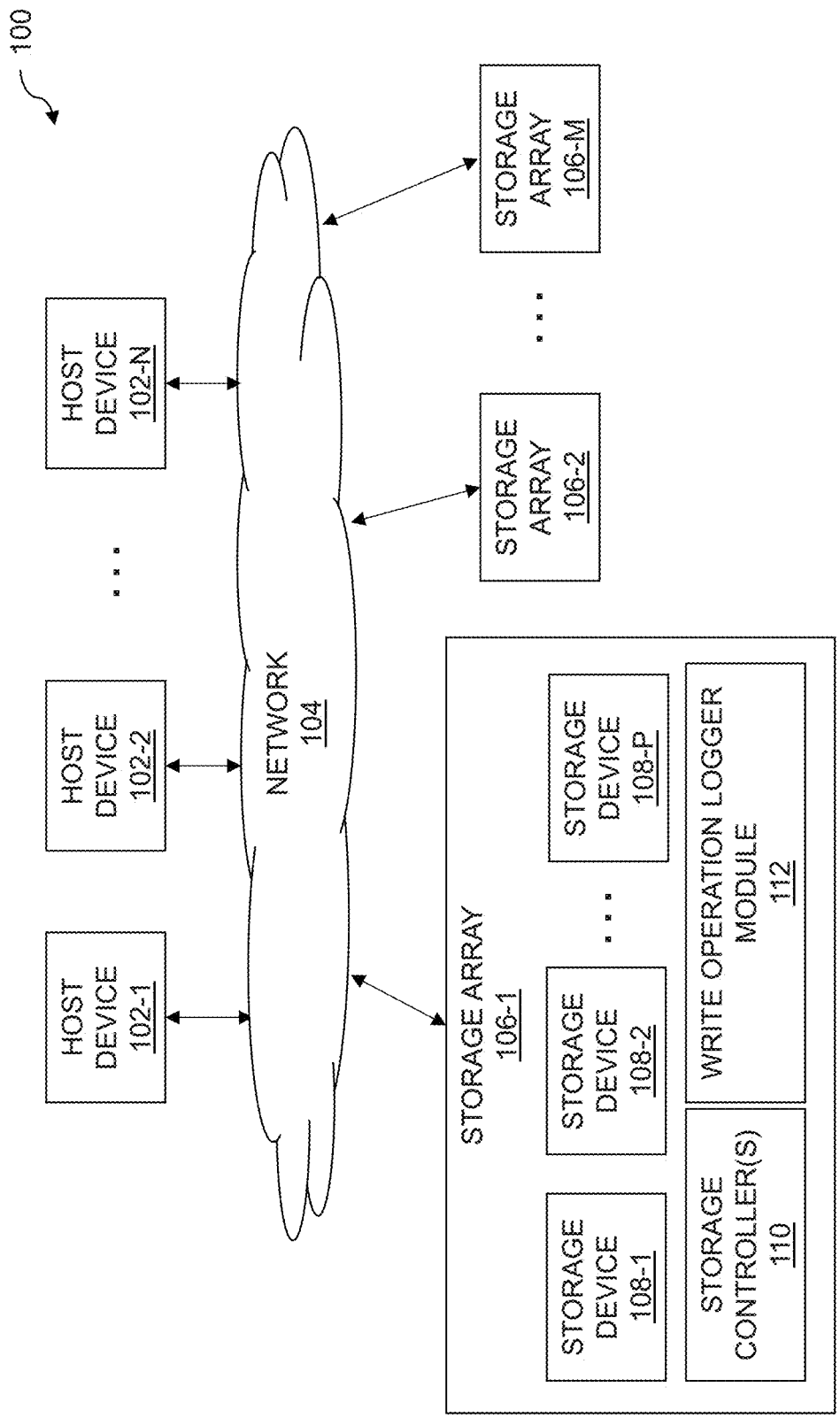
FIG. 1 is a block diagram of an information processing system including a storage array configured with functionality for managing one or more write operations in an illustrative embodiment.

FIG. 1 shows an information processing system 100 configured in accordance with an illustrative embodiment. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108-1, 108-2, . . . 108-P (collectively, storage devices 108) each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands, e.g., a read operation comprises one or more read commands and a write operation comprises one or more write commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of the host devices 102 and the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

The storage array 106-1 in the present embodiment may comprise additional components not explicitly shown in the figure, such as a response time control module and IO operation priority queues, illustratively configured to make use of the above-described persistent memory. For example, the response time control module may be used to implement storage array-based adjustments in response time for particular IO operations based at least in part on service level objective (SLO) information stored by the storage array 106-1 in its persistent memory. The response time control module is assumed to operate in conjunction with the above-noted IO operation priority queues.

The storage array 106-1 illustratively utilizes its IO operation priority queues to provide different levels of performance for IO operations. For example, the IO operation priority queues may have respective different priority levels. The storage array 106-1 may be configured to provide different priority levels for different ones of the IO operations by assigning different ones of the IO operations to different ones of the IO operation priority queues. The IO operation priority queues are illustratively associated with respective SLOs for processing of IO operations in the storage array 106-1.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 106.

Numerous other distributed implementations of the host devices 102 and/or the storage array 106 are possible. Accordingly, the storage arrays 106 can also be implemented in a distributed manner across multiple data centers.

Additional examples of processing platforms utilized to implement portions of the system 100 in illustrative embodiments will be described in more detail below in conjunction with FIGS. 17 and 18.

The storage array 106-1 implements a write operation logger module 112, which is an example of what is referred to herein as a "control module" of a storage system. Write operation logger module 112 is also an example of a "write buffer." Although not explicitly shown in FIG. 1 for clarity of illustration, it is assumed in some embodiments that other ones of the storage arrays 106-2 through 106-M implement respective additional instances of a write operation logger module, as well as respective sets of storage devices and storage controllers in a manner similar to that described herein with respect to storage array 106-1. Further, although shown in FIG. 1 as being external to the storage controllers 110 of storage array 106-1, in other embodiments the write operation logger module 112 may be implemented at least partially within one or more of the storage controllers 110. For example, at least one of the storage controllers 110 may be implemented as a virtual storage controller running on an embedded hypervisor of the storage array 106-1. At least part of the write operation logger module 112 may be part of such a virtual storage controller, or may be run separate from the virtual storage controller on such an embedded hypervisor. Various other arrangements are possible, including where at least a portion of the functionality of the write operation logger module 112 is implemented external to the storage array 106-1 (e.g., on a separate server, on a cloud computing infrastructure, etc.).

The write operation logger module 112 is configured to efficiently manage one or more write operations (i.e., IO operations involving IO requests with write commands) in accordance with storage array 106-1. More particularly, as will be further described herein, write operation logger module 112 is configured to reuse overwritten portions of one or more logger page-buffers to improve write operation efficiency. In illustrative embodiments, write operation logger module 112 organizes free logger page-buffers via one or more pools. When overwriting data to the logger, the overwritten logger buffer pages are released to the one or more pools (as illustratively used herein, a page is a fixed-length, memory-contiguous block of data and is typically the smallest unit of data for memory management purposes). Meanwhile, the released pages can be combined with neighboring free pages. With this process of reusing one or more portions of an overwritten logger page-buffer, logger page-buffer utilization efficiency is improved. Furthermore, the pool management functionality employed by write operation logger module 112 prevents pool fragmentation and avoids decreased performance caused by fragmented writing.

Functionality of the write operation logger module 112 may be implemented at least in part in the form of software that is stored in memory and executed by a processor. It is to be understood that the particular set of elements shown in FIG. 1 for managing one or more write operations is presented by way of illustrative example only and, in other embodiments, additional or alternative elements may be used. Thus, another embodiment may include additional or alternative systems, devices and other network entities, as well as different arrangements of modules and other components. It is to be appreciated that these and other features of illustrative embodiments are presented by way of example only, and should not be construed as limiting in any way.

Functionality of the write operation logger module 112 will now be further described.

Assume that, in a storage system, one or more NVMe storage devices are used by write operation logger module 112. Thus, for example, one or more of storage devices 108 can be NVMe storage devices used by write operation logger module 112. In alternative embodiments, other storage devices in storage array 106-1 can be used. Further, in some embodiments, NVMe storage devices may be part of the write operation logger module 112 itself. In any case, when host data is written to the storage system, the data is first committed to the one or more NVMe storage devices and a write complete message is returned to the initiating host device 102. Dirty data within the one or more NVMe storage devices is flushed to the backend at an appropriate time.

Thus, write operation logger module 112 manages the write operations that occur with respect to the one or more NVMe storage devices and, in the following description, may be referred to simply as the "logger."

Before describing logger operations according to illustrative embodiments in the context of FIGS. 4-14, typical write operations using a logger ring set will first be described in the context of FIGS. 2 and 3.

Figure 2:
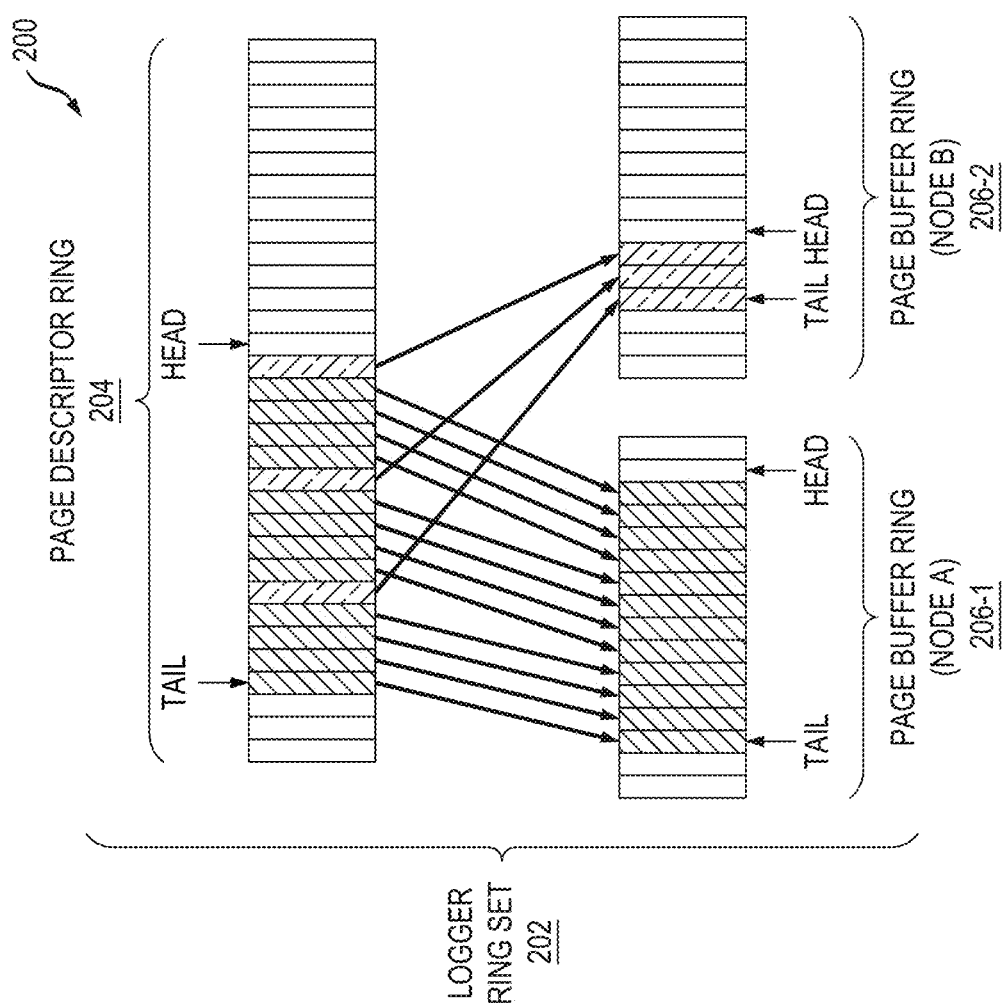
FIGS. 2 and 3 illustrate typical write operations of a write buffer with a logger ring set.

As shown in example 200 of FIG. 2, NAME storage spaces are organized into rings by the logger. That is, the incoming user data is written into the header position of the ring buffer and dirty pages are flushed from the tail position.

During writing of user data, besides the data itself, its description including information such as logical address, volume identifier (id), snap info, etc. is also persisted into the one or more NVME storage devices. As shown in example 200, the logger uses a ring set 202 to manage the user data and the description. As shown, the ring set 202 includes one page-descriptor ring 204 and two page-buffer rings 206-1 and 206-2. Each of the two page-buffer rings shown in this embodiment corresponds to a different storage controller (also referred to as a "storage processor" or "node") of a dual controller storage array. As shown, page-buffer ring 206-1 corresponds to node A of a storage array, while page-buffer ring 206-2 corresponds to node B of the storage array. Thus, an IO request is handled by one of the two nodes. User data is stored in either of the page-buffer rings 206-1 and 206-2, depending on which controller handles the IO request, and the data description of the user data is stored in page-descriptor ring 204. Thus, the page-descriptor ring 204 is shared by the two nodes such that each node stores data description to the same ring.

For example, as further shown, the first user data page after the head position identified in page-descriptor ring 204 is designated for handling by node B and thus is stored just after the head position in page-buffer ring 206-2. Note that used or occupied (unavailable) page positions are designated by hash marks while free (available) page positions have no hash marks. Also note that all-solid hash marks denote node A, while a combination of dashed-and-solid hash marks denote node B). Similarly, the second user data page after the head position identified in page-descriptor ring 204 is designated for handling by node A and thus is stored just after the head position in page-buffer ring 206-1. Accordingly, user data being handled by node A is shown between the head and tail positions of page-buffer ring 206-1, while user data being handled by node B is shown between the head and tail positions of page-buffer ring 206-2. Each user data page stored in page-buffer rings 206-1 and 206-2 has a corresponding entry between head and tail positions in page-descriptor ring 204 including information such as, but not limited to, logical address, volume identifier (id), snap info, etc.

In some embodiments, the three rings 204, 206-1 and 206-2 in the ring set 202 are is stored by RAID tiers, e.g., a page-descriptor tier, a node A page-buffer tier, and node B page-buffer tier. It is to be understood that while the example described herein shows one page-descriptor ring and two page-buffer rings, alternative implementations may have different numbers of page-descriptor rings and/or page-buffer rings.

Accordingly, logger data pages are organized by rings in a logger ring set. A conventional logger typically allocates free pages from the ring head such that only the pages that are outside the ring head and tail (i.e., not between the head and tail) can be used by a new incoming write command.

Figure 3:
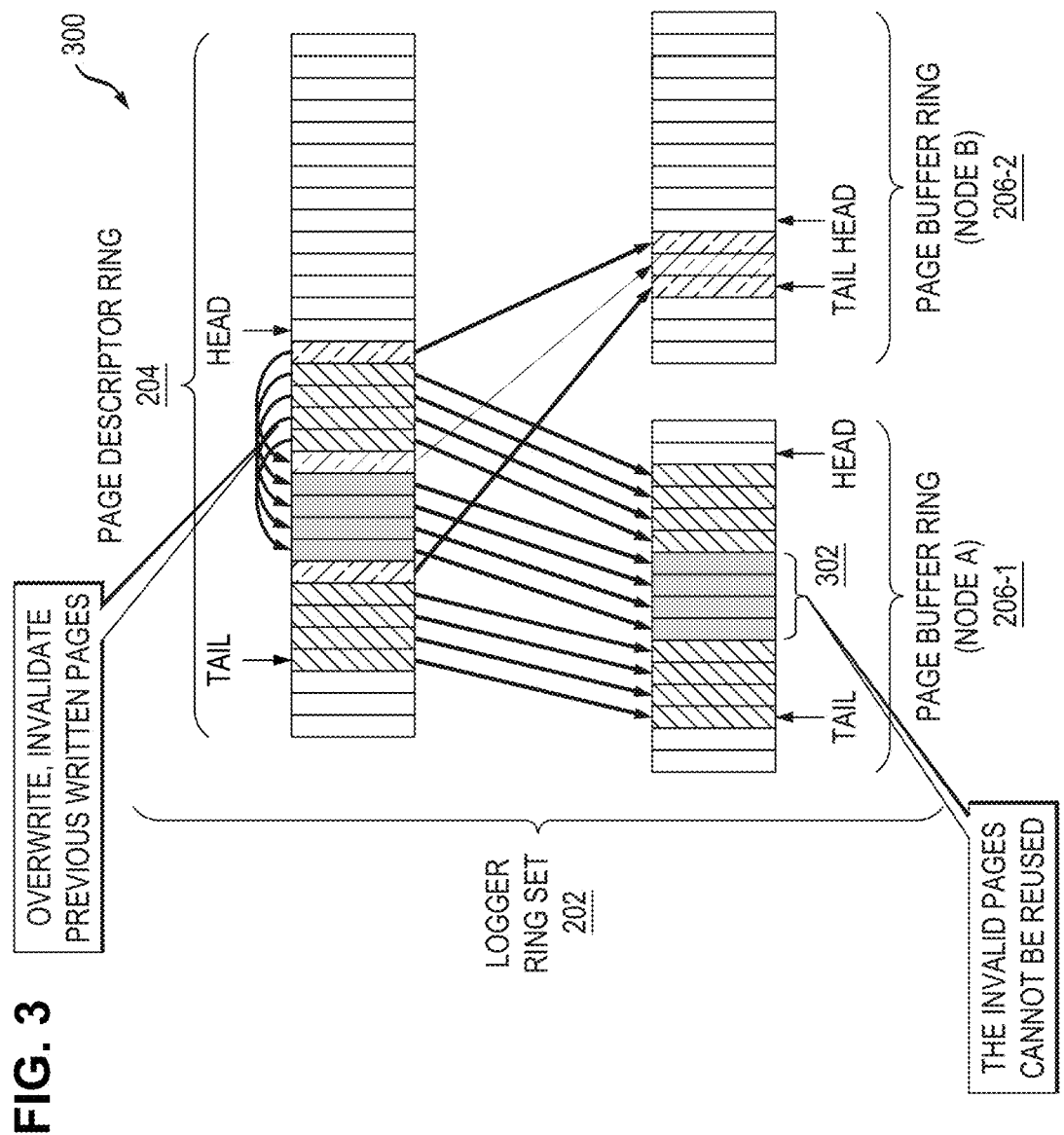

As shown in example 300 of FIG. 3, if dirty pages are overwritten, a new incoming write operation commits new user data into the new locations just after the head position of the page-descriptor ring 204. Then, using the same typical page-buffer allocation scheme mentioned above in example 200 of FIG. 2, the previous written dirty pages (illustrated with shading in positions following the new data) are marked as invalid. Accordingly, as shown in page-buffer ring 206-1, the invalidated pages create an unusable hole or gap 302 between the head and tail positions since, in the type of loggers shown in FIGS. 2 and 3, the invalidated pages cannot be reused until the tail is moved across their position. In some case, due to too many holes, there may be only a few free pages available to be allocated in the page-buffer ring.

In such case, a new incoming write operation needs to wait until there are enough pages available between the head and tail positions.

Illustrative embodiments overcome the above and other drawbacks of the type of loggers shown in FIGS. 2 and 3 by managing the logger page-buffer with a free page-buffer pool(s). When allocating new pages, the logger picks one or more pages from the pool, and after a page is invalidated, the logger releases the page to the pool. Thus, in accordance with illustrative embodiments, write operation logger module 112 is configured with the above-mentioned pool management functionality. Pool management functionality and associated write operations in accordance with illustrative embodiments will now be described in the context of FIGS. 4 through 14.

Figure 4:
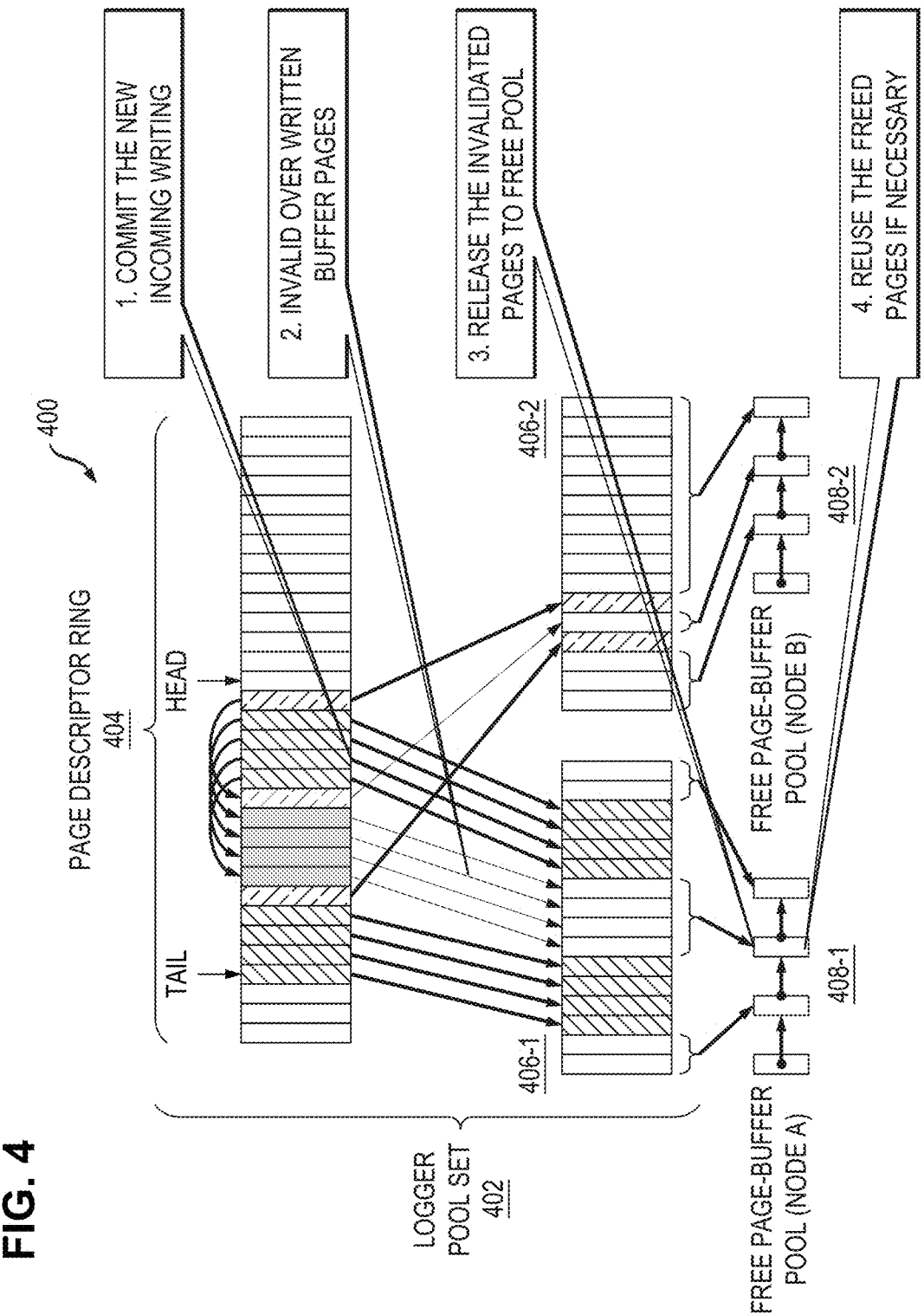
FIGS. 4 through 14 illustrate a write buffer with pool management functionality and associated write operations in accordance with one or more illustrative embodiments.

As shown in example 400 of FIG. 4, a logger pool set 402 comprises a page-descriptor ring 404 and two page-buffer rings 406-1 and 406-2. Each of the two page-buffer rings shown in this embodiment corresponds to a different storage controller (storage processor or node) of a dual controller storage array (e.g., storage controller(s) 110 of storage array 106-1). As shown, page-buffer ring 406-1 corresponds to node A of a storage array, while page-buffer ring 406-2 corresponds to node B of the storage array. Thus, an IO request is handled by one of the two nodes. User data is stored in either of the page-buffer rings 406-1 and 406-2, depending on which controller handles the IO request, and the data description of the user data is stored in page-descriptor ring 404. Thus, the page-descriptor ring 404 is shared by the two nodes such that each node stores data description to the same ring.

However, different than the example 300 shown in FIG. 3, in the embodiment of example 400, each page-buffer ring has a free page-buffer pool associated therewith. Thus, page-buffer ring 406-1 has a free page-buffer pool 408-1, while page-buffer ring 406-2 has a free page-buffer pool 408-2. More particularly, in accordance with this embodiment, invalidated buffer pages in a page-buffer ring are released to the corresponding free page-buffer pool after a new incoming data overwrite is committed successfully. Accordingly, a subsequent write operation can reuse pages from the free page-buffer pool. FIG. 4 depicts the following exemplary steps:

Step 1: Commit the new incoming overwrite data and its descriptor to the logger first.

Step 2: After committing the overwrite transaction successfully, invalidate the overwritten pages.

Step 3: Release the invalidated buffer pages to free page-buffer pool.

Step 4: For the following writing request, the logger can reuse the overwritten pages from the free page-buffer pool when needed.

Figure 5:
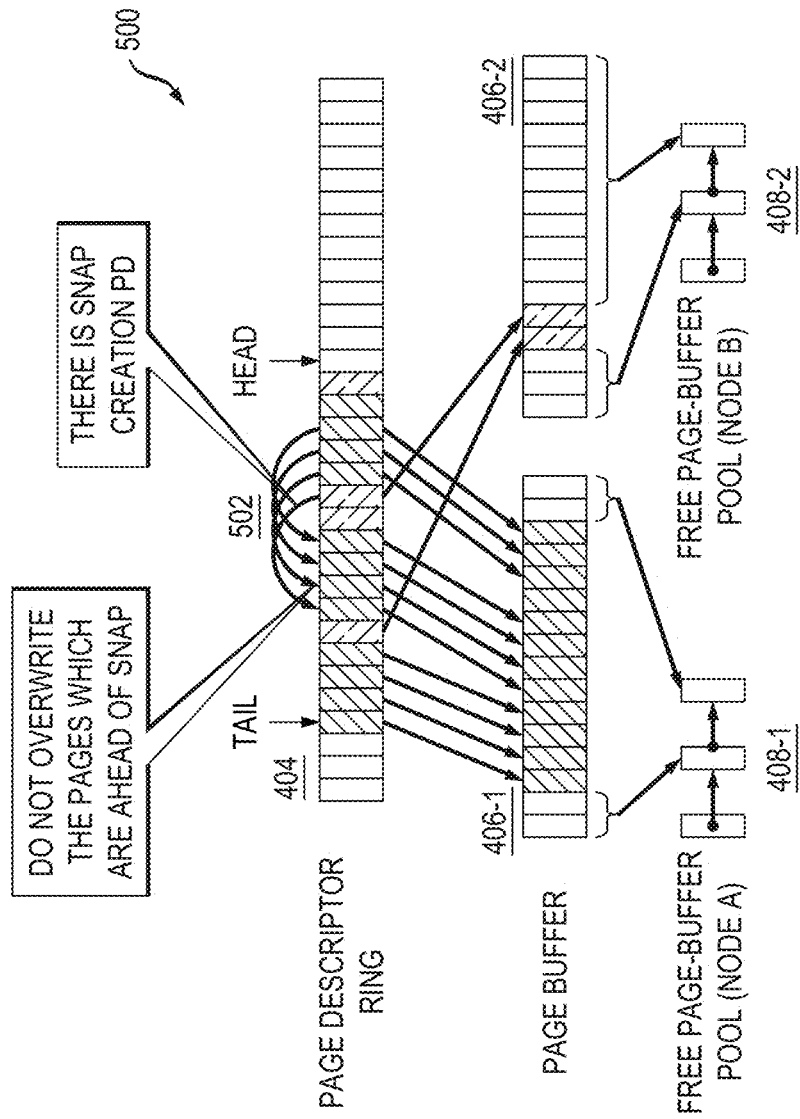

Furthermore, in accordance with an illustrative embodiment illustrated as example 500 in FIG. 5, if there is a snap creation (i.e., storage snapshot creation) in page-descriptor ring 404, as shown, the pages ahead of the snap are persisted in the snap volume and those pages are not overwritten (denoted by 502).

Figure 6:
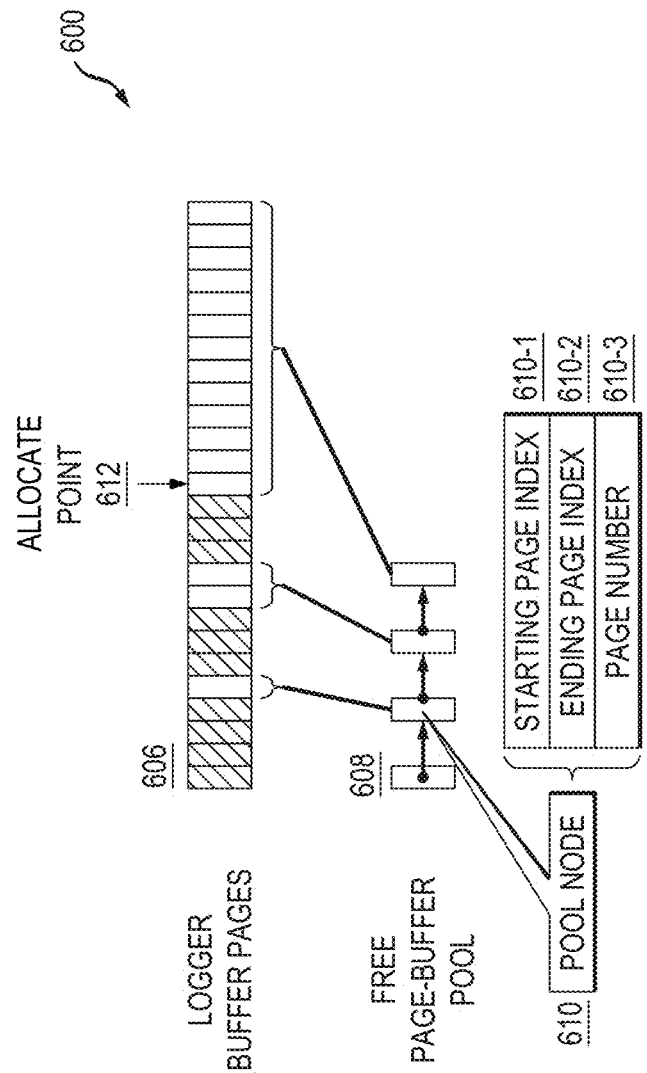

FIG. 6 depicts an illustrative embodiment, as example 600, of a data structure for organizing the free pages of a free page-buffer pool. As shown, a page-buffer ring 606 has a corresponding free page-buffer pool 608. It is to be appreciated that page-buffer ring 606 and free page-buffer pool 608 are examples of page-buffer ring 406-1 and free page-buffer pool 408-1 or page-buffer ring 406-2 and free page-buffer pool 408-2.

The free page-buffer pool 608 is comprised of multiple pool nodes. Each pool node 610 of the free page-buffer pool 608 indicates a segment of continuous free pages. By way of example only, as shown, the second pool node (from left to right in pool 608) corresponds to one free page in the page-buffer 606, the third pool node corresponds to two free pages, and the last pool node corresponds to 13 free pages. A pool node 610 is defined by segments including starting page index 610-1, ending page index 610-2, and number of pages (page number) 610-3. Allocate point 612 for the pool indicates the next allocating position with its pointer value increasing after a successful allocation.

When allocating free pages, the logger (i.e., write operation logger module 112) tries to allocate continuous pages from the allocate point first. If the number of pages starting at the allocate point is not sufficient for the required allocation (i.e., the number of pages needed for the current write operation), the logger tries to allocate continuous pages from one or more other nodes. If none of the nodes have enough continuous pages, the logger allocates separate pages from multiple nodes and returns a scattered list of free pages.

When releasing pages, the logger creates a new pool node and inserts the node into the free page-buffer pool 608. When inserting a node, if the node is continuous with its neighboring segment, the releasing pages are merged into the existing continuous node. Further details of page allocating and page releasing will be described below.

First, various illustrative use cases of page allocation are described.

Case 1. Allocate from the Allocate Point.

Figure 7:
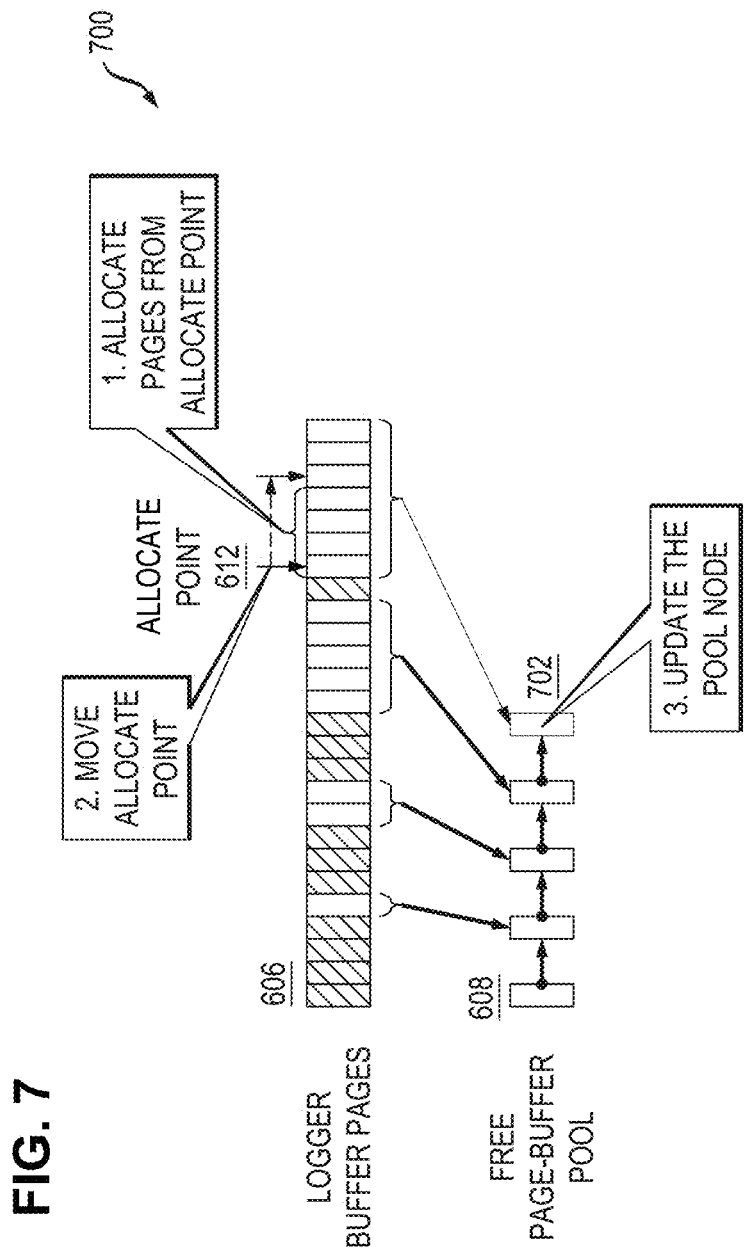

As shown in example 700 of FIG. 7, if there are enough continuous free pages at the allocate point 612, the logger (i.e., write operation logger module 112) allocates new pages from the allocate point first. FIG. 7 depicts the following exemplary steps:

Step 1: Allocate new buffer pages from the allocate point 612.

Step 2: Move the allocate point 612 forward, so that the next allocation will get pages from the new point.

Step 3: After pages are allocated from the pool node (e.g., 702), update the starting page index and page number of the node. Once the page number decreases to zero, remove the node from pool.

Case 2. Allocate from Best Fit Segment.

Figure 8:
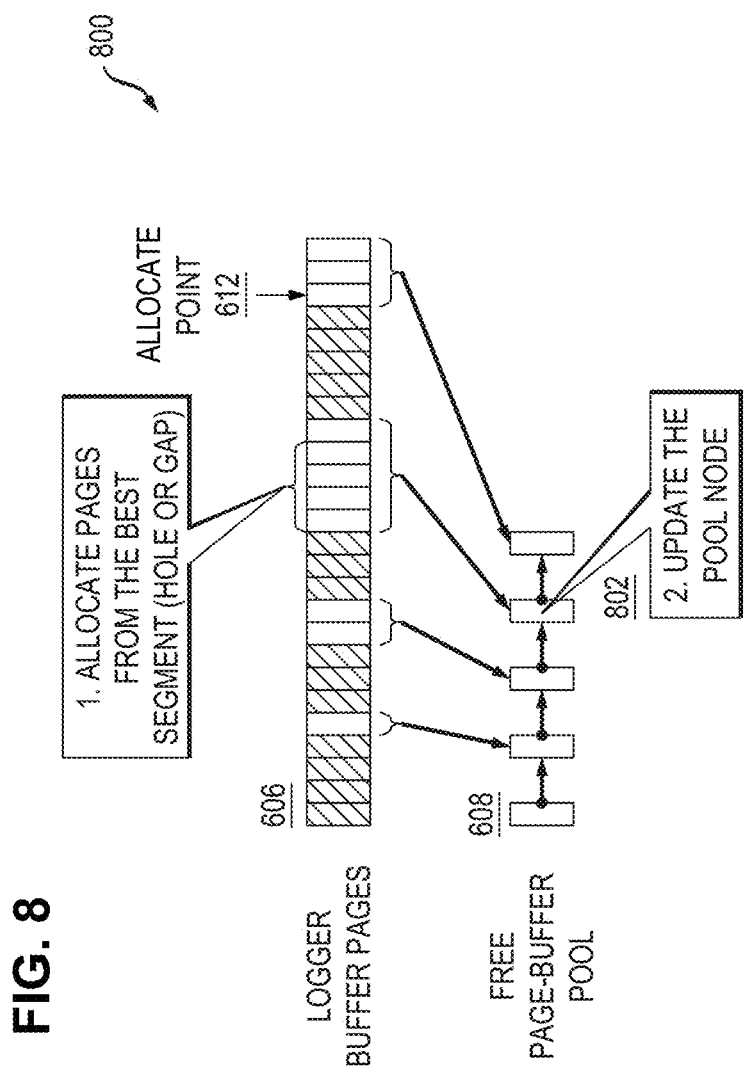

As shown in example 800 of FIG. 8, if the continuous page number at the allocate point 612 is not enough for the required allocation, the logger (i.e., write operation logger module 112) finds the best fit node from all the nodes in free page-buffer pool 608. The logger then allocates continuous buffer pages from the best fit pool node. FIG. 8 depicts the following exemplary steps:

Step 1: Look for the best fit node from free page-buffer pool 608. In illustrative embodiments, the best fit node is the node that has sufficient continuous pages for the required allocation and its page number is the smallest among other candidate nodes. The new buffer pages are allocated from the best fit pool node (e.g., 802).

Step 2: Update the allocated pool node and remove the node if necessary.

Case 3. Allocate Separate Pages from Multiple Nodes.

Figure 9:
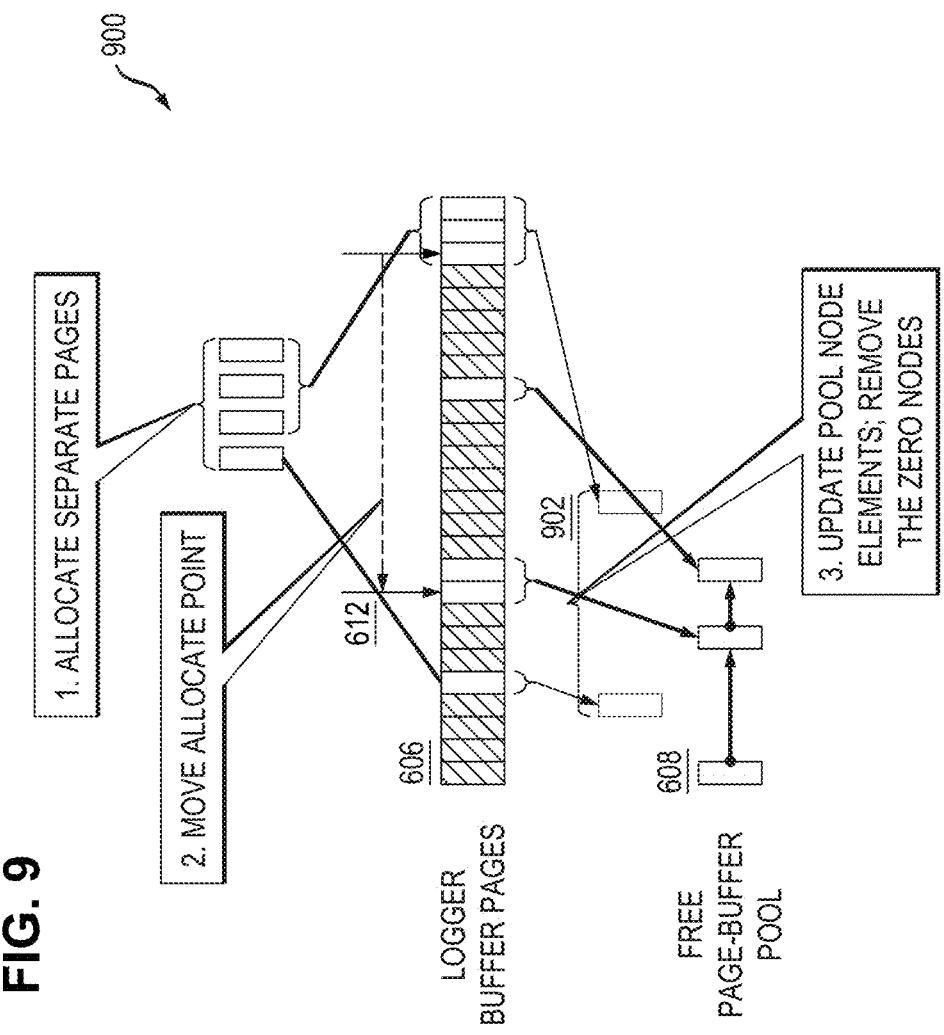
Figure 10:
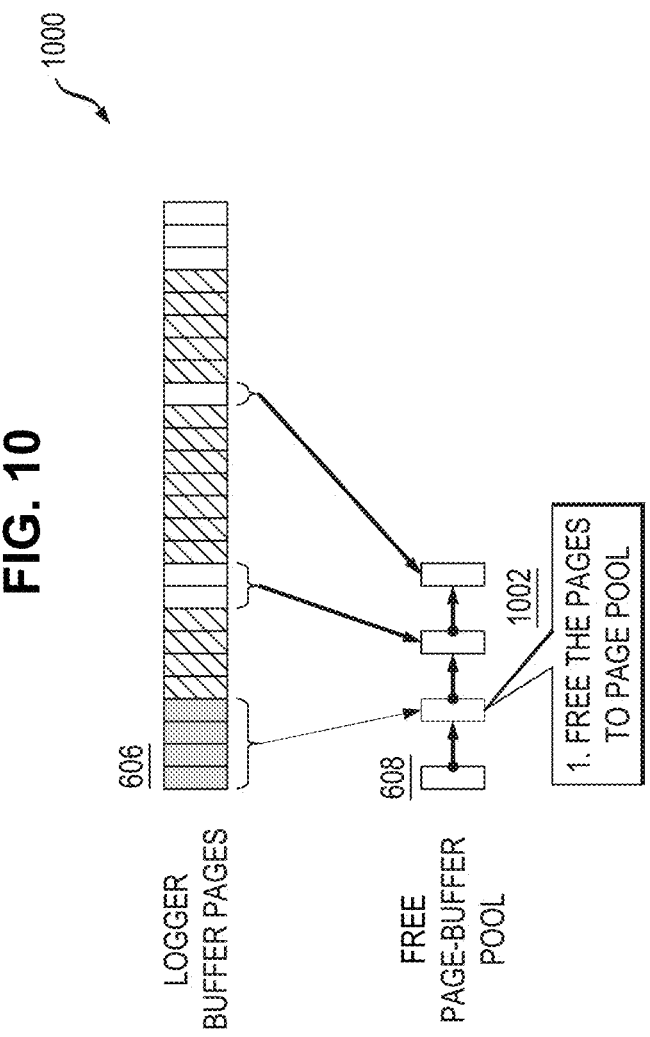

As shown in example 900 of FIG. 9, if all page numbers of pool nodes are less than the required allocation number, the logger (i.e., write operation logger module 112) cannot allocate continuous pages from the pool. Accordingly, the logger allocates separate pages from multiple nodes and returns a scattered list of free pages. FIG. 9 depicts the following exemplary steps:

Step 1: Assume the logger cannot find enough continuous pages from the free pool nodes. The logger allocates separate pages from the allocate point and the other free nodes.

Step 2: Move allocate point forward to the first free node.

Step 3: Update pool nodes, update page sizes of the pool nodes, and if the size of any node(s) becomes zero, remove the node(s) from pool (e.g., 902).

Turning now to page releasing, after overwritten pages are committed successfully, the previous overwritten buffer pages are released to the free page-buffer pool. As shown in example 1000 in FIG. 10, when releasing buffer pages to the free page-buffer pool 608, the logger (i.e., write operation logger module 112) creates a new pool node first, sets the attributes of the node including starting page index 610-1, ending page index 610-2, and page number 610-3. The logger then inserts the node into the free page-buffer pool (e.g., 1002).

Figure 11:
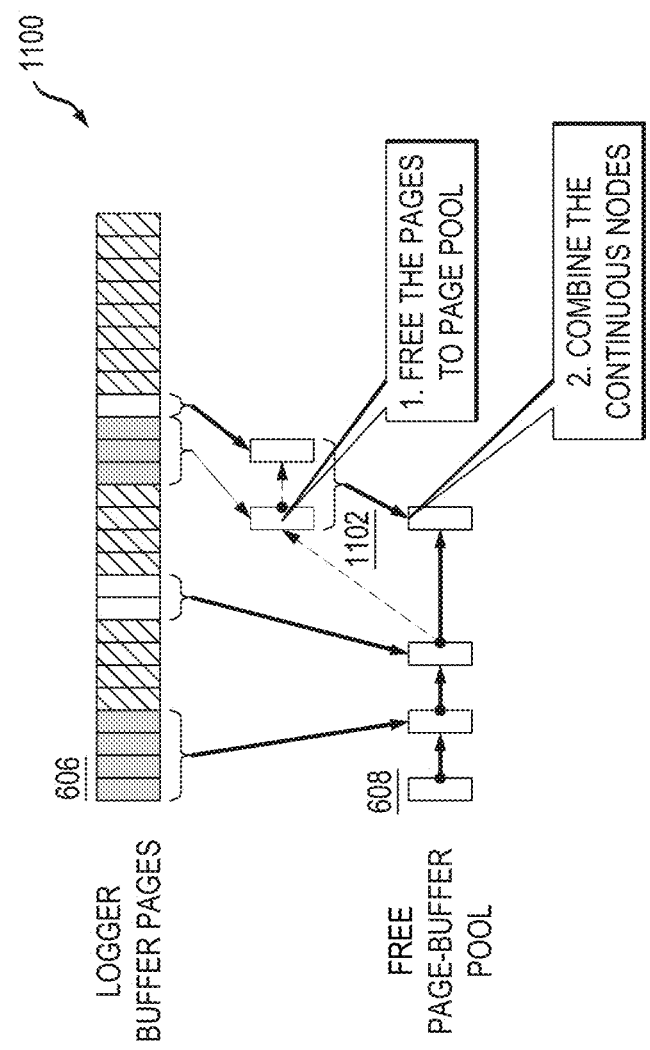

As shown in example 1100 of FIG. 11, during insertion of a node to the free page-buffer pool 608, the logger compares the freeing node with its neighboring nodes. If the freeing node is continuous with its previous node or the next node, the logger combines the continuous nodes into one node (e.g., 1102).

Furthermore, the write operation logger module 112 is configured to perform transaction recovery steps, as will be explained below.

After the overwritten buffer pages are released, they may be reused by subsequent write operations. However, the pages are only marked invalid in the page descriptor in-memory, i.e., the overwritten page descriptors are not persisted. To ensure transactional integrity, the storage system replays the committing operations of the logger during a system recovery following a system crash.

Figure 12:
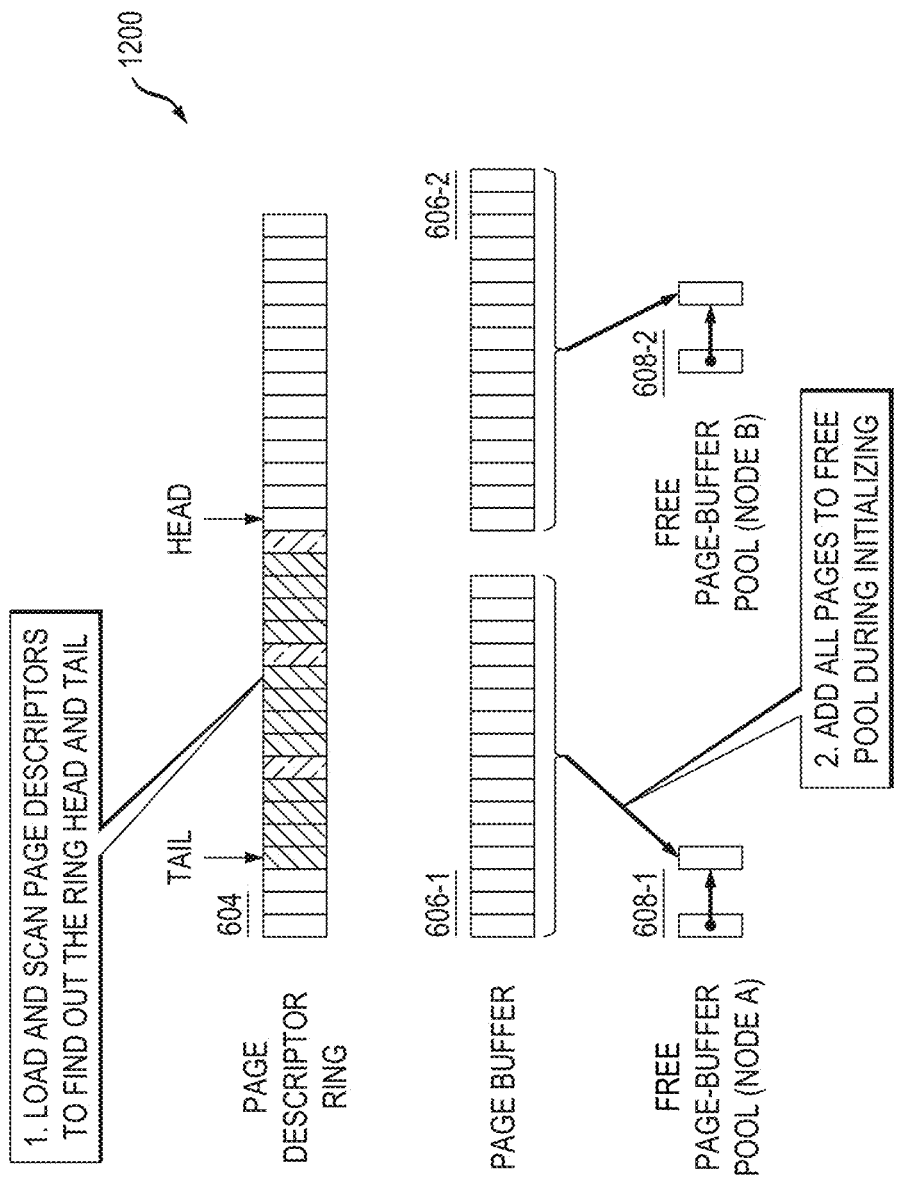
Figure 13:
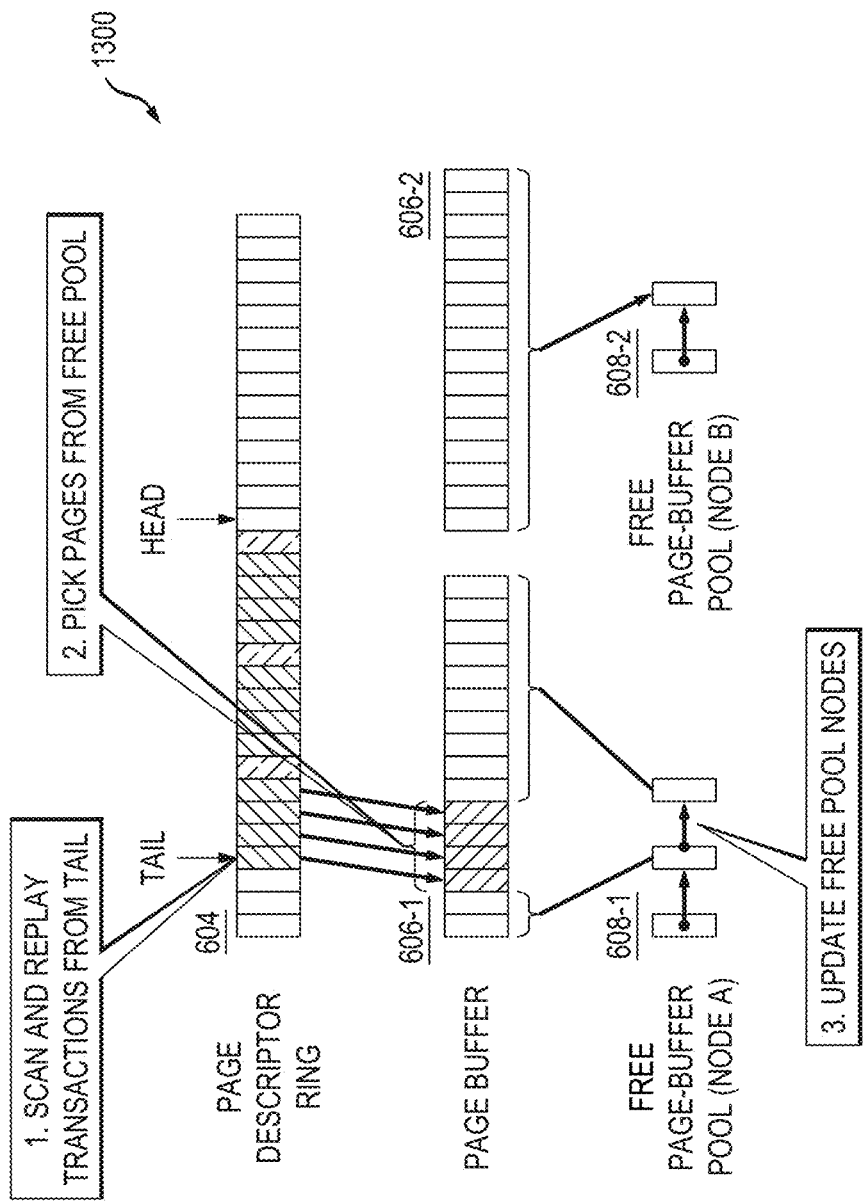
Figure 14:
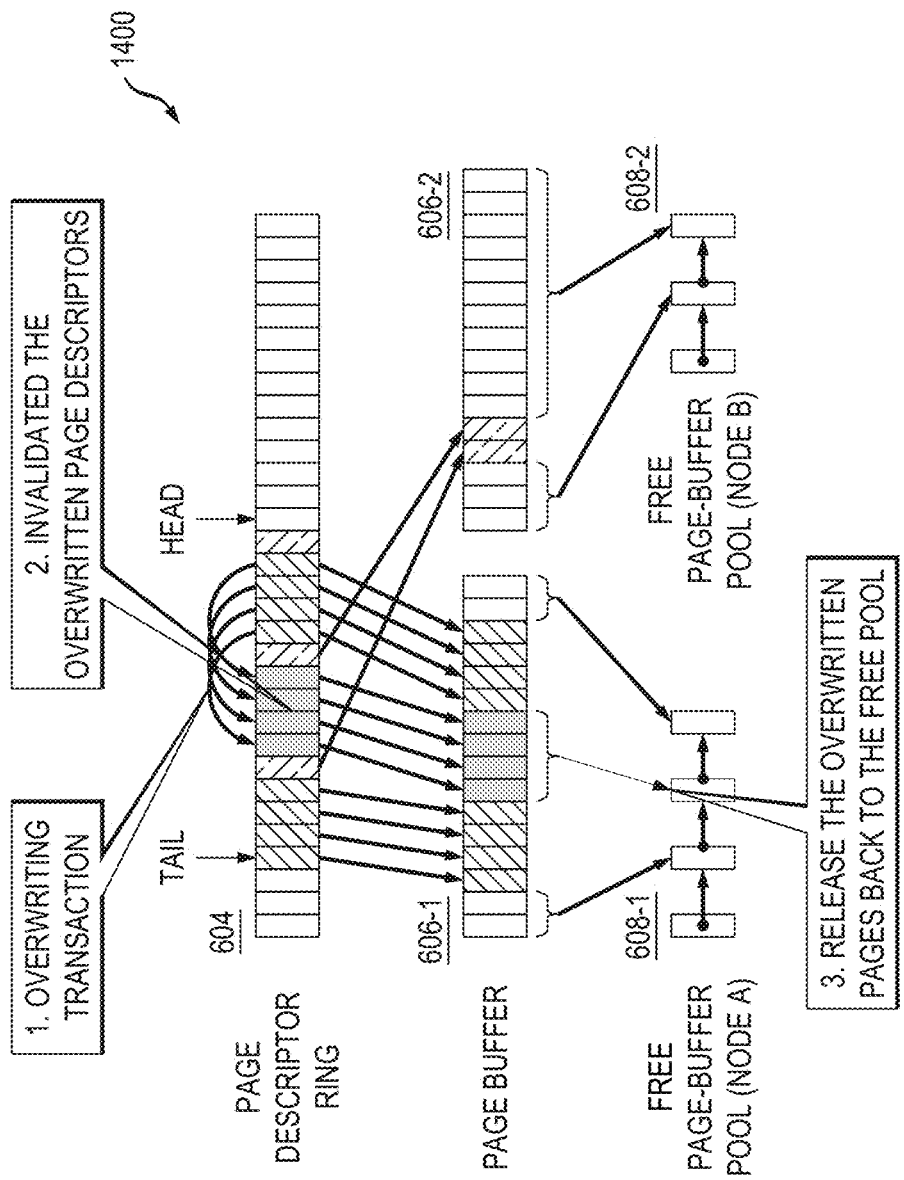

During system recovery, the logger loads the page-descriptor (PD) ring from NVMe storage and then finds the ring tail and head. The logger then scans the PD ring from the tail and recovers the transactions. The logger also recovers the free page-buffer pool(s) during system recovery. FIGS. 12-14 depict the exemplary steps.

As shown in FIG. 12, example 1200 depicts the following exemplary steps:

Step 1: Initialize logger pool set. Create and initialize logger page-descriptor ring 604 and scan the page-descriptor ring 604 to find out the ring head and tail positions.

Step 2: Create and initialize page-buffer rings 606-1 and 606-2 and free page-buffer pools 608-1 and 608-2. When initializing the page-buffer pools, all buffer pages are added to the free pools.

The logger then replays the committing transactions from tail position to head position.

In one case, as shown in example 1300 in FIG. 13, during replaying (step 1 in FIG. 13), the logger picks buffer pages that belong to the replaying transaction from the free page-buffer pools (step 2 in FIG. 13). Then, after the pages are picked, the pool nodes that the pages belong to are updated (step 3 of FIG. 13).

In another case, as shown in example 1400 in FIG. 14, if the replaying transaction is an overwriting transaction (step 1 of FIG. 14), the logger invalidates the previous overwritten pages (step 2 of FIG. 14), and releases the overwritten pages to the corresponding free page-buffer pool (e.g., 608-1).

The pool management functionality of the write operation logger module as described herein has many advantages over existing loggers. For example, as is evident, transaction logger properties are unchanged since this functionality only reorganizes the page-buffer(s) into pool(s), and the page descriptor is still managed with a page description ring buffer. Also, with this functionality, the transaction commit order is unchanged and dirty pages are still flushed in the committing order.

Furthermore, overwritten pages are only released after the new overwriting transaction is committed successfully. The overwritten pages are the outdated version. However, if there is a snap in the logger descriptor ring, then the pages written before the snap are not overwritten.

Still further, during transaction replay, when the replaying operation reaches the overwritten page, it may be added to the wrong page descriptor. However, when the replaying reaches the overwriting transaction, as discussed above, the overwritten page is released.

Accordingly, with the pool management functionality, logger buffer pages are released to the free page-buffer pool immediately after being overwritten. One or more subsequent write requests can use the overwritten pages, now free pages, as needed. In existing loggers, the invalidated overwritten pages cannot be used until the ring tail is moved beyond the position of the overwritten pages. Thus, with the pool management functionality, the logger page-buffer utilization efficiency is improved.

In addition, dirty pages are either overwritten or flushed in a relatively short time frame. As such, buffer pages are not held for a relatively long time. Such properties help to avoid fragments in the pool. Also, with the pool management functionality described herein, the logger attempts to allocate continuous pages. As a result, in most cases, the buffer pages are continuous and commit performance does not decrease.

Figure 15:
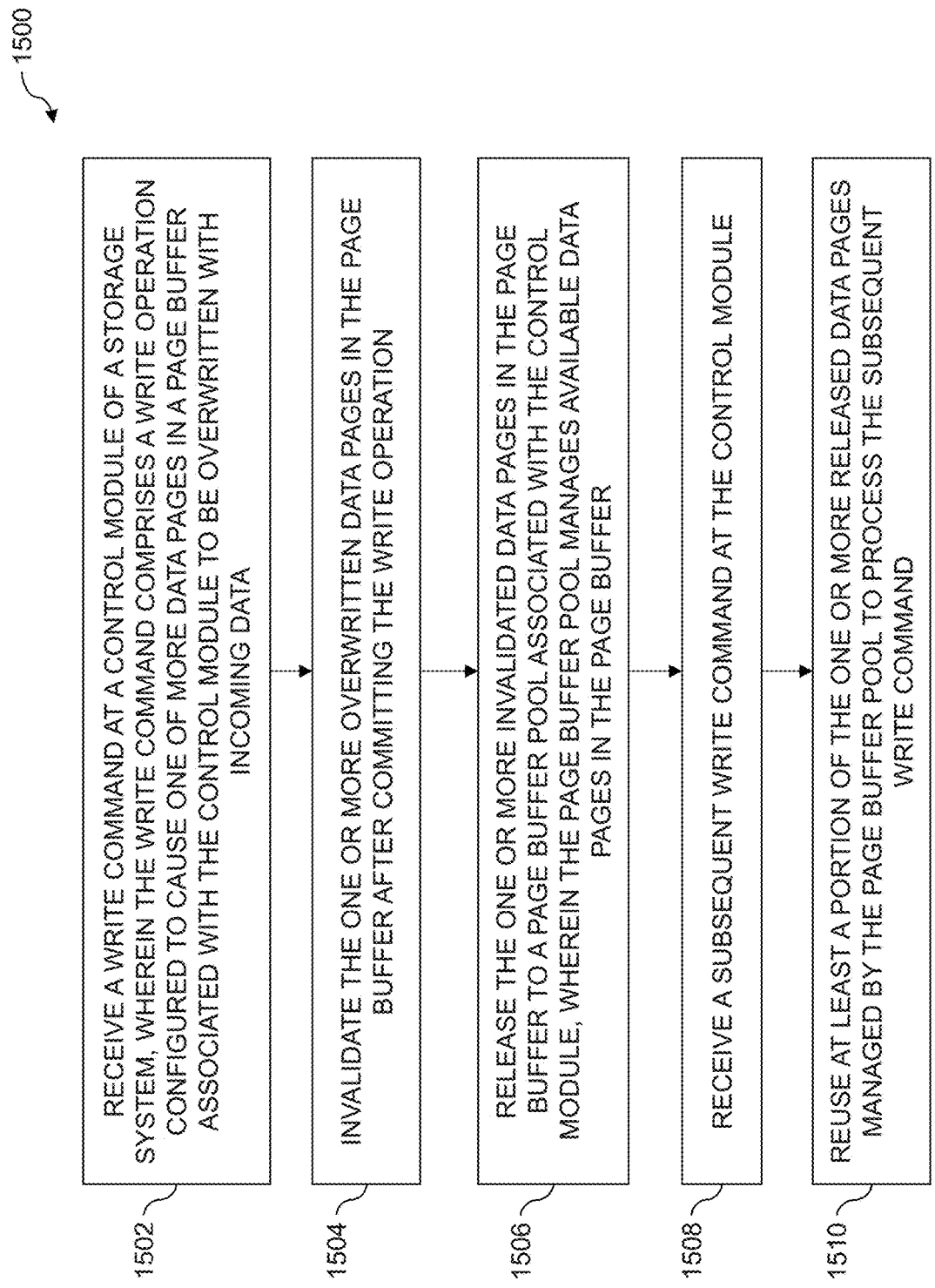
FIG. 15 is a flow diagram of an exemplary process for managing one or more write operations in an illustrative embodiment.

FIG. 15 is a flow diagram of an exemplary process 1500 for managing one or more write operations in an illustrative embodiment. As shown in process 1500, step 1502 receives a write command at a control module of a storage system, wherein the write command comprises a write operation configured to cause one or more data pages in a page buffer associated with the control module to be overwritten with incoming data. Step 1504 invalidates the one or more overwritten data pages in the page buffer after committing the write operation. Step 1506 releases the one or more invalidated data pages in the page buffer to a page buffer pool associated with the control module, wherein the page buffer pool manages available data pages in the page buffer. Step 1508 receives a subsequent write command at the control module. Step 1510 reuses at least a portion of the one or more released data pages managed by the page buffer pool to process the subsequent write command.

Figure 16:
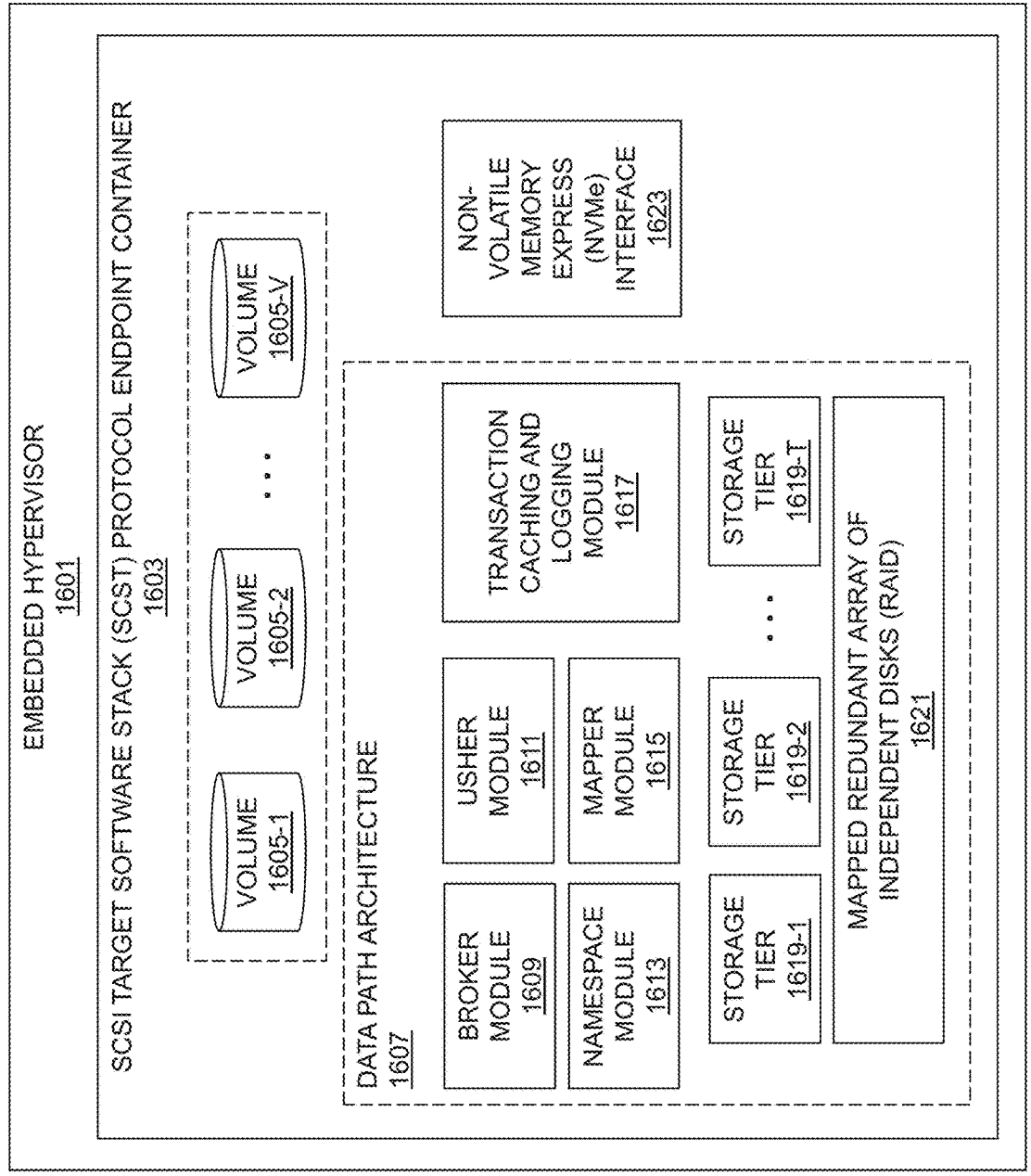
FIG. 16 is a block diagram of an embedded hypervisor implementing a data path architecture in an illustrative embodiment.

FIG. 16 shows a view of a data path architecture 1607 for an I/O stack of a storage array (e.g., storage array 106-1). The data path architecture 1607 is assumed to be implemented on an embedded hypervisor 1601 (e.g., a VMware ESXi™ hypervisor) that runs a base container 1603 providing an SCSI target software stack (SCST) protocol endpoint. The embedded hypervisor 1601 is an example of a "virtual" storage controller of a storage system (e.g., a virtual one of the storage controllers 110 in storage array 106-1). The SCST protocol endpoint container 1603 includes a set of volumes 1605-1, 1605-2, . . . 1605-V (collectively, volumes 1605) and the data path architecture 1607. The data path architecture 1607 includes a broker module 1609, usher module 1611, namespace module 1613, mapper module 1615, and a transaction caching and logging module 1617. The data path architecture 1607 also includes a set of storage tiers 1619-1, 1619-2, . . . 1619-T (collectively, storage tiers 1619) and a mapped redundant array of independent disks (RAID) 1621. The transaction caching and logging module 1617 is configured to utilize NVMe interface 1623 as described in further detail below. It is to be appreciated that a write operation logger module (e.g., 112 in FIG. 1 with pool management functionality as illustratively depicted in FIGS. 4-14) can be implemented as part of transaction caching and logging module 1617 in data path architecture 1607.

The broker module 1609 is configured to facilitate communication amongst the various other modules of the data path architecture 1607. In some embodiments, the data path architecture 1607 implements a layered services model (e.g., for copy engines, replication, migration, etc.). The usher module 1611 is configured to implement I/O request queues, including priority share-based scheduling and Quality of Service (QoS) for I/O requests in such queues. The namespace module 1613 is configured to implement active/active "thin" volumes and maintain volume attributes. The namespace module 1613 is also configured to implement a key-value (K-V) store and directories. The mapper module 1615 is configured to implement a thin mapping layer using log-structured writes, with inline compression, deduplication and pattern matching functionality. The mapper module 1615 is also configured to implement functionality for snapshotting and determining snapshot differentials, for performing space accounting, and for file system checking (e.g., using a tool such as a Linux file system consistency check (FSCK) tool). The transaction caching and logging module 1617 is configured to implement transactions for the active/active volumes, to perform distributed locking, and to implement read/write-back and write-ahead logs. The transaction caching and logging module 1617 may comprise two instances, one for data and one for metadata. The mapped RAID 1621 is configured to implement distributed virtual striping (e.g., using 4+1 and 8+1 RAIDS implementations) and to provide thin rebuild and distributed sparing. The mapped RAID 1621 may support various native block sizes (e.g., 512 bytes (B), 4096B or 4 kilobytes (KB), etc.).

In some embodiments, the usher module 1611 implements a data plane polling model. From the producer side (e.g., of the SCST protocol endpoint), requests are submitted using per-core threads. Polling threads pull new I/O requests to user space. The polling threads may execute when associated data plane threads are idle. Load balancing, affinity and QoS (e.g., share-based scheduling and traffic shaping) features may be provided.

The namespace module 1613, as described above, is configured to create and expose thin block volumes, and provides functionality for volume management and attributes as well as space management and accounting. The namespace module 1613 enables or provides a namespace layer that utilizes a block interface with file-like semantics. In the namespace layer, volumes (e.g., volumes 1605) are bound to block protocol endpoints (e.g., PE LUNs). The mapper module 1615 enables or provides a mapping layer, which exposes a single contiguous thin address space to the namespace layer. The namespace layer consumes the logical address space provided by the mapper layer.

The namespace layer may use a format that includes a "super block" created by an internal format and anchored at a logical block address (LBA) of 0. The super block identifies locations of allocations, an inode table, and a "root" directory. The allocations provide references to extent allocators, used to manage free space, as well as to inodes. The extent allocators may use a binary buddy system, and enable efficient reclaim and defragmenting functionality. In some embodiments, the minimum allocation size is 8 MB, and the minimum allocation size for virtual volumes (VVols) such as volumes 1605 is 2 GB. The volume allocation aligns to the "mid" level of the mapper as described in further detail below.

The inode allocators provide references to an inode table, which in some embodiments is scalable to millions of inodes and is organized as a free list. An inode may include various content, such as an object type (e.g., file, directory), family universally unique identifier (UUID), inode number and generation, link count, unique identifier (UID) owner, global identifier (GID) owner, object extent location, create and other timestamps, parent inode number, parent directory cookie, etc. The root inode references a root directory object that contains a list of filenames and inodes, while additional inodes contain volume data (e.g., by allocating a data extent and inode, and adding the volume name and inode to the root directory). Multiple volume data extents may be created. Object handles may be used by the usher module 1611 to submit I/O thru handles (e.g., inodes) to avoid unnecessary name lookup.

The transaction caching and logging module 1617 may implement a transaction cache and a transaction log. The transaction cache, in some embodiments, is transactional and provides read and write cache buffering with two instances (e.g., data and metadata). The transaction cache pages data and metadata in and out of memory, and provides local and distributed peer-to-peer (P2P) sticky locks. In some embodiments, an active/active configuration, an ALUA configuration, or combination thereof may be used. For example, the data path architecture 1607 may be active/active, while SCST supports both active/active and ALUA. The transaction log provides write-ahead transaction logs, such as by using low latency mirrored NVRAMs for persistence. The transaction cache, for example, may be implemented in-memory (e.g., DRAM), while the transaction log is persisted to NVRAM.

The mapper module 1615, as noted above, may provide a mapping layer of the data path architecture 1607. The mapping layer may provide various functionality, such as enabling patterns, deduplication, compression, and mapping. Pattern functionality includes storing patterns (e.g., rather than pointer+data), and re-generates data on read, and may include 4 KB of 0s or 1s (where, in this context, 0s are different than unmapped space). Deduplication functionality includes the use of a fingerprint cache and read and compare validation. Compression functionality may include the use of various types of compression algorithms, including QAT hardware offload, LZ Deflate, Dynamic Huffman, etc. In some embodiments, data is compressed and packed into 2 MB data stripes. The mapping functionality includes a thin map, implemented in some embodiments as a 512-way B-tree structure described in further detail below. The thin map in such embodiments is keyed by LBA (e.g., rather than using content-addressable storage (CAS)), and provides snapshot and differential capability along with copy-by-reference. The mapper module 1615 may utilize the storage tiers 1619 (e.g., using flash tiers, storage-class memory (SCM) tiers, NVRAM tiers, etc.).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for managing one or more write operations by reusing one or more overwritten portions of a write buffer of a storage system will now be described in greater detail with reference to FIGS. 17 and 18. Although described in the context of system 100, these platforms may also be used to implement at least portions of other information processing systems in other embodiments.

Figure 17:
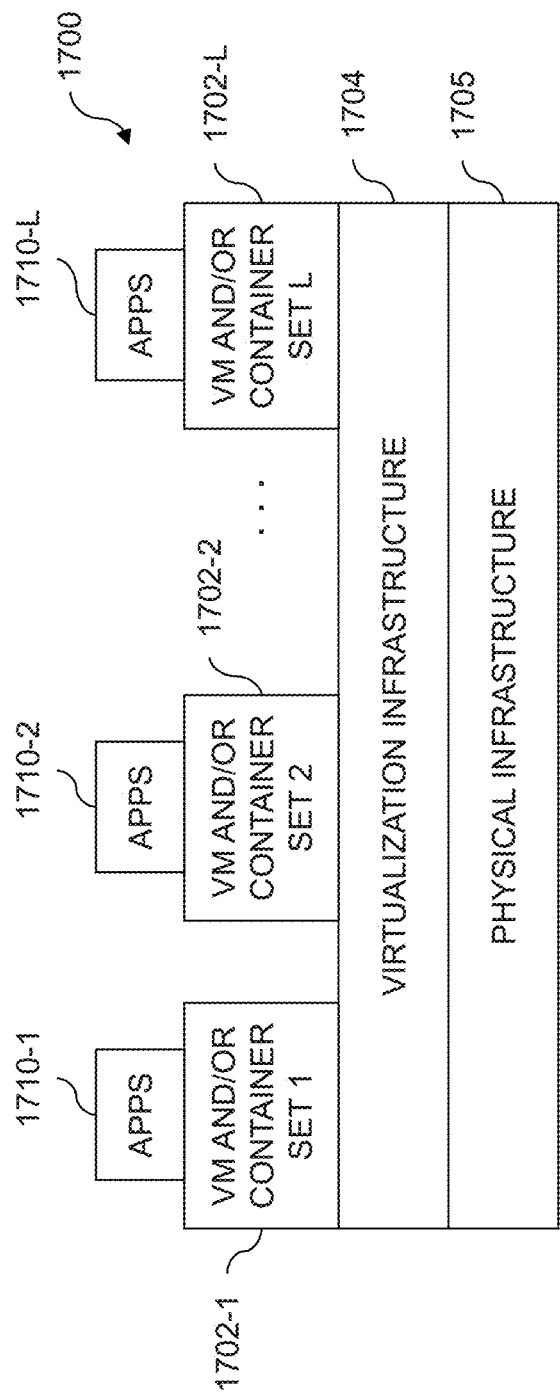
FIGS. 17 and 18 show examples of processing platforms that may be utilized to implement at least a portion of an information processing system in illustrative embodiments.
Figure 18:
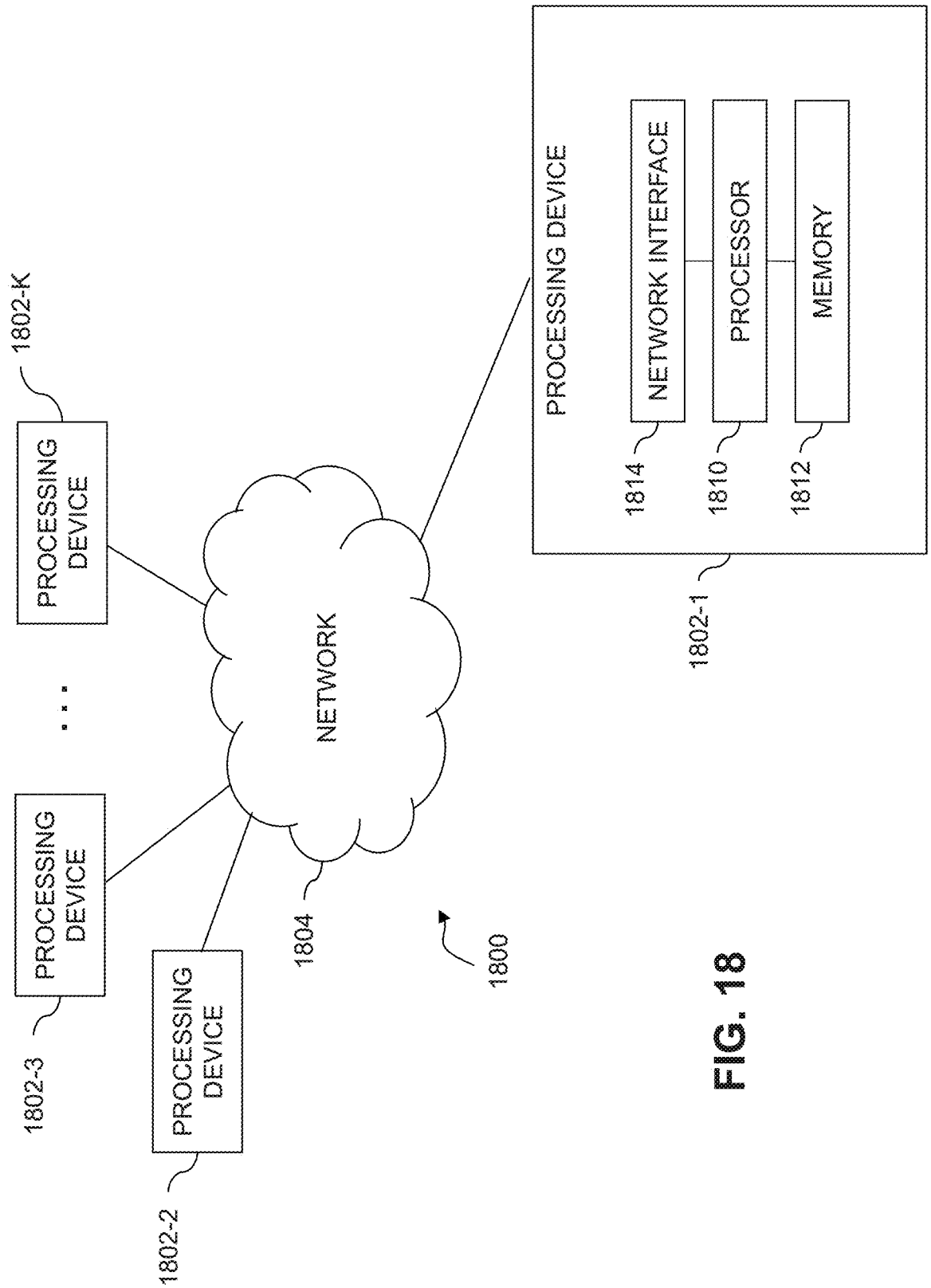

FIG. 17 shows an example processing platform comprising cloud infrastructure 1700. The cloud infrastructure 1700 comprises a combination of physical and virtual processing resources that may be utilized to implement at least a portion of the information processing system 100 in FIG. 1. The cloud infrastructure 1700 comprises multiple virtual machines (VMs) and/or container sets 1702-1, 1702-2, . . . 1702-L implemented using virtualization infrastructure 1704. The virtualization infrastructure 1704 runs on physical infrastructure 1705, and illustratively comprises one or more hypervisors and/or operating system level virtualization infrastructure. The operating system level virtualization infrastructure illustratively comprises kernel control groups of a Linux operating system or other type of operating system.

The cloud infrastructure 1700 further comprises sets of applications 1710-1, 1710-2, . . . 1710-L running on respective ones of the VMs/container sets 172-1, 1702-2, . . . 1702-L under the control of the virtualization infrastructure 1704. The VMs/container sets 1702 may comprise respective VMs, respective sets of one or more containers, or respective sets of one or more containers running in VMs.

In some implementations of the FIG. 17 embodiment, the VMs/container sets 1702 comprise respective VMs implemented using virtualization infrastructure 1704 that comprises at least one hypervisor. A hypervisor platform may be used to implement a hypervisor within the virtualization infrastructure 1704, where the hypervisor platform has an associated virtual infrastructure management system. The underlying physical machines may comprise one or more distributed processing platforms that include one or more storage systems.

In other implementations of the FIG. 17 embodiment, the VMs/container sets 1702 comprise respective containers implemented using virtualization infrastructure 1704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1700 shown in FIG. 17 may represent at least a portion of one processing platform. Another example of such a processing platform is processing platform 1800 shown in FIG. 18.

The processing platform 1800 in this embodiment comprises a portion of system 100 and includes a plurality of processing devices, denoted 1802-1, 1802-2, 1802-3, . . . 1802-K, which communicate with one another over a network 1804.

The network 1804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1802-1 in the processing platform 1800 comprises a processor 1810 coupled to a memory 1812.

The processor 1810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1812 may comprise random access memory (RAM), read-only memory (ROM), flash memory or other types of memory, in any combination. The memory 1812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1802-1 is network interface circuitry 1814, which is used to interface the processing device with the network 1804 and other system components, and may comprise conventional transceivers.

The other processing devices 1802 of the processing platform 1800 are assumed to be configured in a manner similar to that shown for processing device 1802-1 in the figure.

Again, the particular processing platform 1800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for managing one or more write operations by reusing one or more overwritten portions of a write buffer of a storage system as disclosed herein are illustratively implemented in the form of software running on one or more processing devices.

It should again be emphasized that the above-described embodiments are presented for purposes of illustration only.

Many variations and other alternative embodiments may be used. For example, the disclosed techniques are applicable to a wide variety of other types of information processing systems, storage systems, storage devices, tree structures, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to:
   receive a write command at a control module of a storage system, wherein the write command comprises a write operation configured to cause one or more data pages in a page buffer associated with the control module to be overwritten with incoming data;
   invalidate the one or more overwritten data pages in the page buffer after committing the write operation; and
   release the one or more invalidated data pages in the page buffer to a page buffer pool associated with the control module, wherein the page buffer pool manages available data pages in the page buffer, and wherein the page buffer pool is configured as a data structure with one or more nodes, and wherein each node of the one or more nodes specifies a segment of continuous data pages available in the page buffer.

2. The apparatus of claim 1, wherein the at least one processing device is further configured to:
   receive a subsequent write command at the control module; and
   reuse at least a portion of the one or more released data pages managed by the page buffer pool to process the subsequent write command.

3. The apparatus of claim 1, wherein the at least one processing device is further configured to:
   determine that one or more data pages in the page buffer is associated with a storage snapshot creation; and
   persist the one or more data pages associated with the storage snapshot creation when the received write command comprises a write operation that would otherwise cause the one or more data pages associated with the storage snapshot creation to be overwritten.

4. The apparatus of claim 1, wherein each node of the one or more nodes specifies information comprising a starting page index of the segment, an ending page index of the segment, and a number of pages in the segment.

5. The apparatus of claim 4, wherein the at least one processing device is further configured to update the information in a given one of nodes when a data page is released to or allocated from the given one of the nodes.

6. The apparatus of claim 1, wherein the at least one processing device is further configured to allocate continuous pages from a given one of the nodes of the page buffer pool.

7. The apparatus of claim 6, wherein the at least one processing device is further configured to allocate one or more additional pages from at least another given one of the nodes of the page buffer pool when there are insufficient pages specified in the given one of the nodes.

8. The apparatus of claim 7, wherein one or more of the one or more additional pages from the at least other given one of the nodes are continuous with respect to the continuous pages from the given one of the nodes.

9. The apparatus of claim 7, wherein one or more of the one or more additional pages from the at least other given one of the nodes are not continuous with respect to the continuous pages from the given one of the nodes.

10. The apparatus of claim 1, wherein the at least one processing device is further configured to allocate pages from a given one of the nodes of the page buffer pool using an allocation pointer.

11. The apparatus of claim 1, wherein the at least one processing device is further configured to allocate pages from a given one of the nodes of the page buffer pool by determining a best fit segment.

12. The apparatus of claim 1, wherein the at least one processing device is further configured to allocate pages from two or more nodes of the nodes of the page buffer pool.

13. The apparatus of claim 1, wherein the at least one processing device is further configured to release the one or more invalidated data pages in the page buffer to the page buffer pool by creating an additional node in the page buffer pool and inserting the one or more released data pages into the additional node.

14. The apparatus of claim 1, wherein the at least one processing device is further configured to release the one or more invalidated data pages in the page buffer to the page buffer pool by merging the one or more released data pages into an existing node in the page buffer pool.

15. The apparatus of claim 1, wherein the at least one processing device is further configured to perform a replay operation during a recovery of the storage system in accordance with the page buffer pool.

16. A computer program product comprising a non-transitory processor-readable storage medium having stored therein program code of one or more software programs, wherein the program code when executed by at least one processing device causes the at least one processing device to perform steps of:
   receiving a write command at a control module of a storage system, wherein the write command comprises a write operation configured to cause one or more data pages in a page buffer associated with the control module to be overwritten with incoming data;
   invalidating the one or more overwritten data pages in the page buffer after committing the write operation; and
   releasing the one or more invalidated data pages in the page buffer to a page buffer pool associated with the control module, wherein the page buffer pool manages available data pages in the page buffer, wherein the page buffer pool is configured as a data structure with one or more nodes, and wherein each node of the one or more nodes specifies a segment of continuous data pages available in the page buffer.

17. The computer program product of claim 16, wherein the program code when executed by at least one processing device further causes the at least one processing device to perform steps of:
   receiving a subsequent write command at the control module; and
   reusing at least a portion of the one or more released data pages managed by the page buffer pool to process the subsequent write command.

18. The computer program product of claim 16, wherein the program code when executed by at least one processing device further causes the at least one processing device to perform steps of:

determining that one or more data pages in the page buffer is associated with a storage snapshot creation; and persisting the one or more data pages associated with the storage snapshot creation when the received write command comprises a write operation that would otherwise cause the one or more data pages associated with the storage snapshot creation to be overwritten.

19. A method comprising steps of:

receiving a write command at a control module of a storage system, wherein the write command comprises a write operation configured to cause one or more data pages in a page buffer associated with the control module to be overwritten with incoming data;

invalidating the one or more overwritten data pages in the page buffer after committing the write operation; and releasing the one or more invalidated data pages in the page buffer to a page buffer pool associated with the control module, wherein the page buffer pool manages available data pages in the page buffer, wherein the page buffer pool is configured as a data structure with one or more nodes, and wherein each node of the one or more nodes specifies a segment of continuous data pages available in the page buffer.

20. The method of claim 19, further comprising steps of:

receiving a subsequent write command at the control module; and reusing at least a portion of the one or more released data pages managed by the page buffer pool to process the subsequent write command.

* * * * *